United States Patent [19]
Brookfield et al.

[11] Patent Number: 5,188,647
[45] Date of Patent: Feb. 23, 1993

[54] DROP LEGS FOR COMPRESSED AIR LINES

[75] Inventors: Richard A. Brookfield, Largo; Leonard I. Walle, Clearwater, both of Fla.

[73] Assignee: Compressed Air Filter Technologies, Inc., Clearwater, Fla.

[21] Appl. No.: 831,159

[22] Filed: Feb. 5, 1992

Related U.S. Application Data

[63] Continuation-in-part of Ser. No. 715,487, Jun. 14, 1991.

[51] Int. Cl.$^5$ .............................................. B01D 45/08
[52] U.S. Cl. ........................................ 55/462; 55/322; 55/433
[58] Field of Search ................. 55/185, 199, 433, 438, 55/462, 322

[56] References Cited

U.S. PATENT DOCUMENTS

| | | | |
|---|---|---|---|
| 1,129,755 | 2/1915 | Suprunowski | 55/462 X |
| 2,467,408 | 4/1949 | Semon | 183/73 |
| 3,345,807 | 10/1967 | VonFelden | 55/433 |
| 4,036,615 | 7/1977 | Heintzelman | 55/462 X |

*Primary Examiner*—Charles Hart

[57] ABSTRACT

A drop leg has a housing provided with top and bottom ends. The top end has an inlet and an outlet and the bottom end has a drain. An impingement plate supported within the housing is spaced from the top end to establish a separating chamber and to be directly contracted by the air stream through the inlet. The upper surface of the impingement plate is downwardly and inwardly inclined and has a central drain. The air stream striking the inclined surfaces rebounds towards the outlet. When vapors are to be removed, the drop leg is provided with a bulkhead below the impingement plate and is sealed to the housing and establishes with the impingement plate an intermediate chamber and with the bottom end a lower chamber for contaminants separated from the air stream. The space between the periphery of the impingement plate and a portion of the housing establishes an orifice which may be adjustable, enabling a limited volume of air to escape into the upper chamber which is vented to atmosphere with a resulting pressure drop effecting the further cooling of the impingement plate to assist in the separation of vapors and other contaminants from the air stream. In another embodiment, a baffle plate, which is a free fit in the housing, is employed in place of a bulkhead and the intermediate chamber is not open to the atmosphere. The drain from the housing is provided with an automatic control by which the pressure in the lower chamber so retards flow from the intermediate chamber that vapors coalesce therein and as the coalesced contaminants flow into the lower chamber they are carried by water through the drain.

13 Claims, 4 Drawing Sheets

FIG. 2
FIG. 3
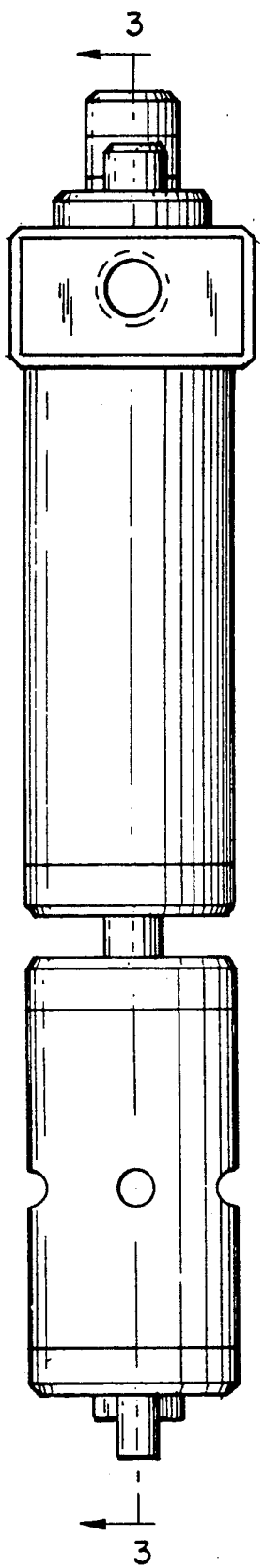
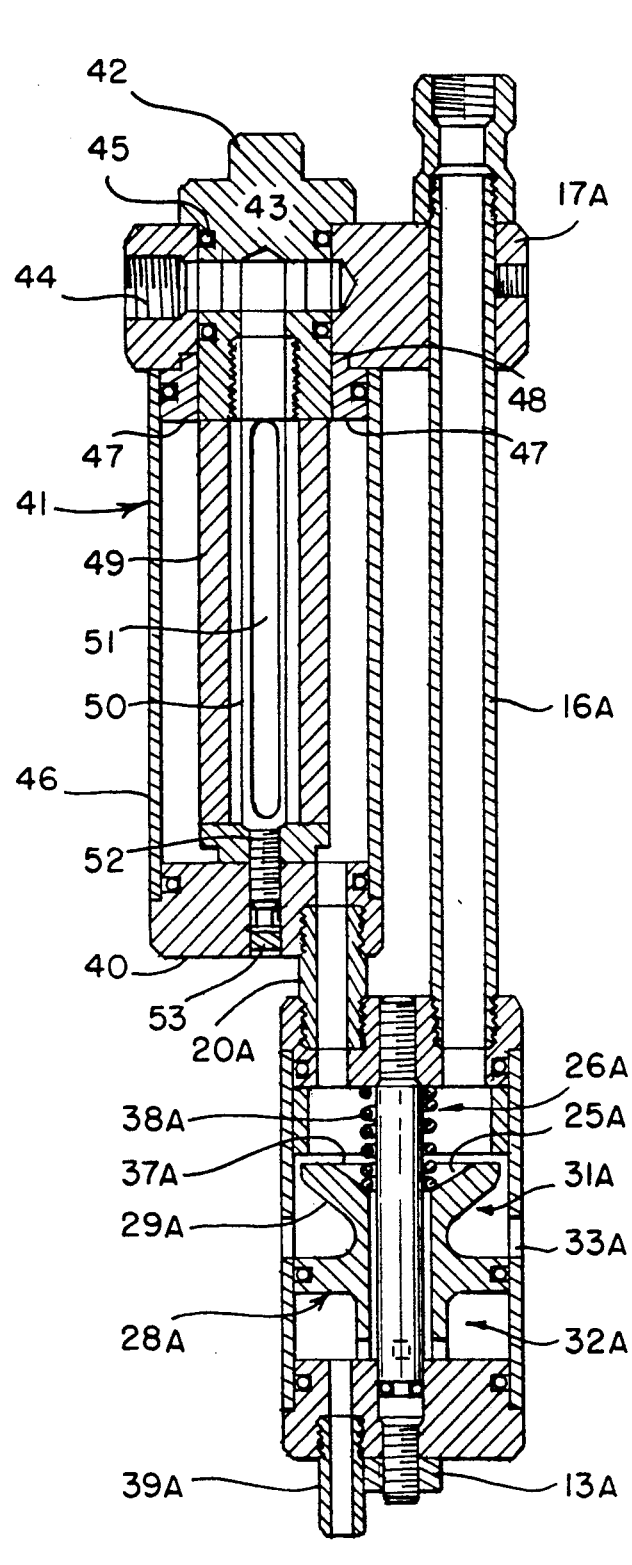

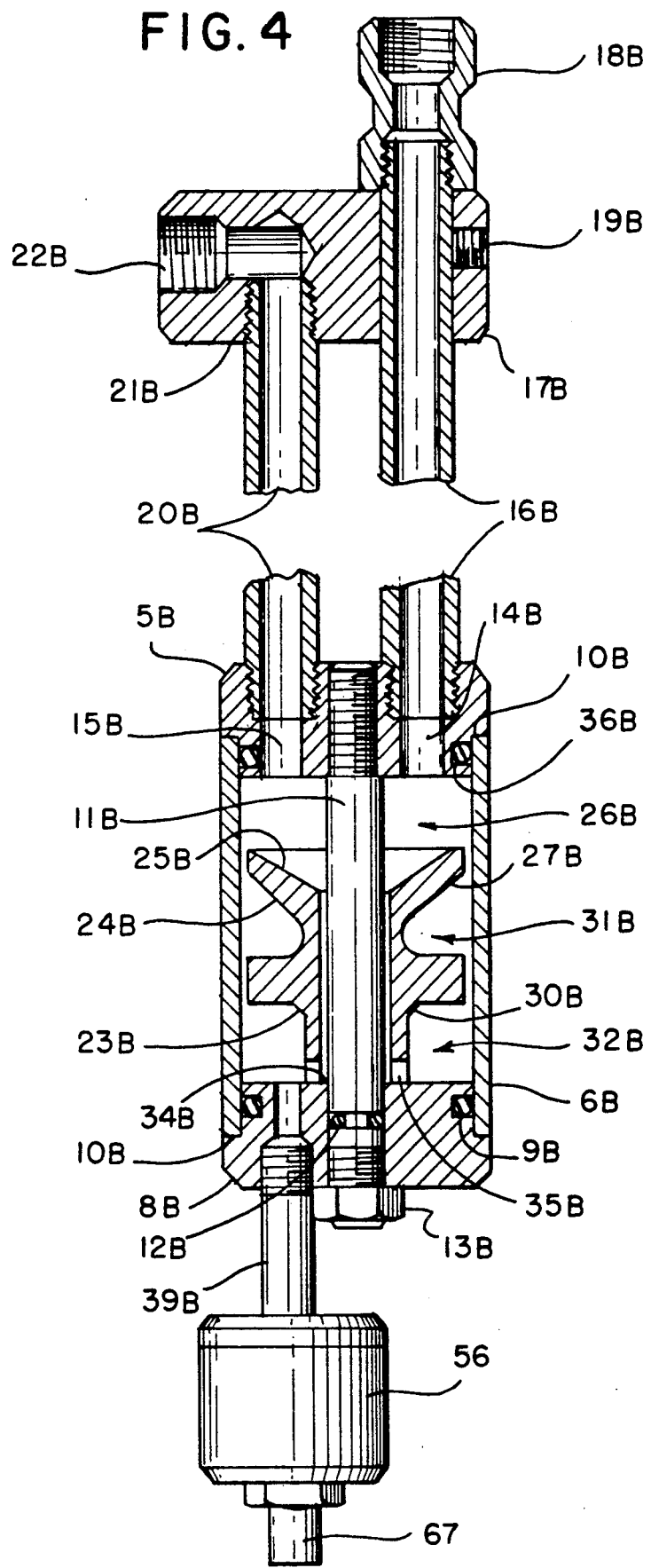

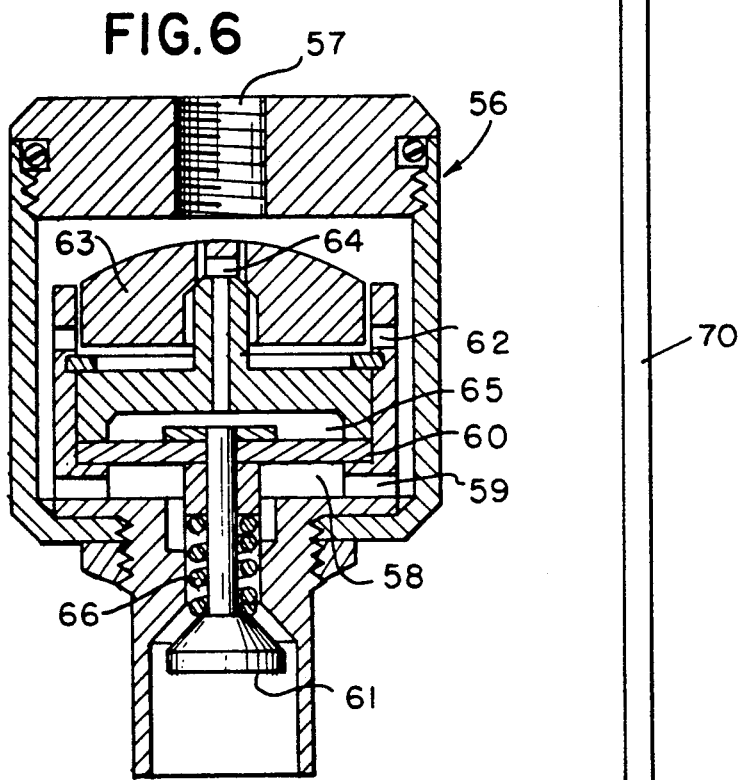
FIG. 6
FIG. 5
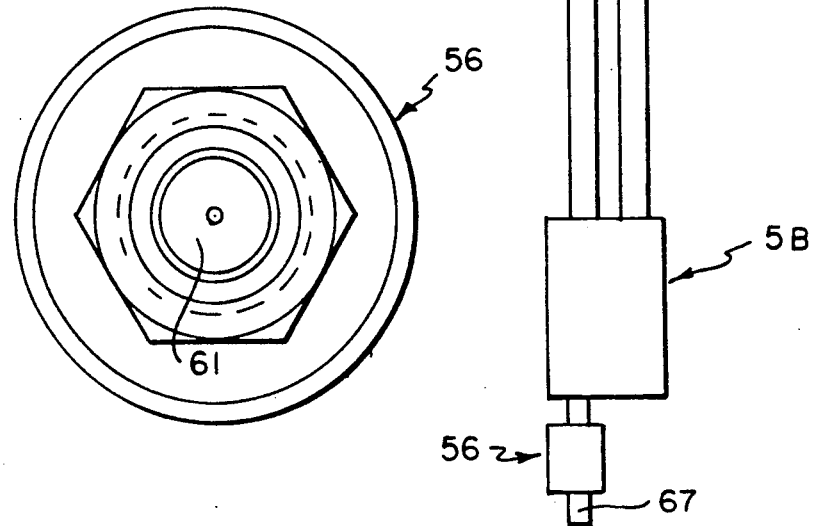
FIG. 7

DROP LEGS FOR COMPRESSED AIR LINES

This is a continuation-in part of Ser. No. 715,487, filed Jun. 14, 1991.

BACKGROUND OF THE INVENTION

The importance of assuring that compressed air is as clean and dry as possible before using it in any type of application is universally appreciated. The process of compressing air not only concentrates impurities in the atmosphere, but adds many more, rendering the final product totally unacceptable for many of the very wide range of applications involving the use of compressed air.

There are many divergent methods available to remove contaminates from compressed air and most of them consist of passing the air through a barrier. The barrier may be chemical or mechanical, but it will always have a limited period of effectiveness, the period being governed by the time it takes to become saturated with contaminates. When this happens the barrier must be cleaned or replaced, involving maintenance time and costs, or the contaminates will be forced into the air line. Anything which will prolong the effectiveness of the barrier is not only a cost saver but also an assurance of a more consistent supply of properly filtered air.

The most basic and effective method of removing the bulk of contaminates carried in an air flow is the use of a drop leg. This strictly mechanical device never clogs up, never wears out and, apart from having to have the accumulation of contaminates drained off, requires no maintenance. It uses a natural phenomena of air flow to separate gas and contaminate molecules and the greater the flow, the more efficient it becomes.

Drop legs have been in use since the first compressed air lines were installed. They originated in a similar capacity for steam lines and were converted to use with compressed air without any major changes. Their effectiveness is qualified by the fact that most suppliers of pneumatic equipment, including filters and dryers, recommend that a drop leg be installed prior to their equipment.

A conventional drop leg consists of a single tube carried past the point of take off of an air drop, an air drop merely being the pipe which carries the air down to working level from the overhead main pipe, or "header." The diameter of the down pipe is usually expanded below the take-off point, capped and fitted with a drain cork. These legs function due to the fact that air molecules travel in a straight line and, having been directed into a flow path by the down pipe, continue in that path until they impinge on the cap at the base of the tube. The gas molecules rebound and continue to move with undiminished energy, but anything which has no energy of its own, usually such as water, dirt and oil, is left at the point of impingement.

This is, of course, a "catch as catch can" arrangement and rapidly loses its original efficiency when any accumulation of contaminates occurs. The turbulence then actually re-introduces the lighter contaminate matter into the air flow, leaving only the heavier matter at the base of the tube. This is evident when draining a drop leg and a heavy sludge is drawn off. Nevertheless, this is the very stuff which is most dangerous to filter screens and tools so the leg serves a very worthwhile purpose.

It has been proposed to provide drop legs with a separate air outlet. As far as we are aware, such air outlets have required the air, after striking the impingement surface to pass downwardly below that surface in a turbulent manner such as to cause reentry into the outlet air stream of at least the lighter contaminants which may have been removed. See U.S. Pat. Nos. 2,467,408 and 3,345,807.

THE PRESENT INVENTION

The general objective of the present invention is to provide drop legs for compressed air lines of greatly increased efficiency in removing contaminants from the air.

In accordance with one aspect of the invention, this objective is attained with drop legs each of which has an outlet above an impingement surface within a housing to receive directly rebounding air and continue its upward course and at the same time draining separated contaminants into a zone isolated from turbulence. Each such drop leg has a straight inlet tube disposed to discharge air downwardly against the impingement surface and of sufficient length to ensure that the air molecules and entrained matter are all travelling in a straight line, the tube length approximately fifteen times the internal diameter of the tube. Best results are attained with the impingement surface inclined inwardly and downwardly in a manner such that rebounding air is directed generally towards the outlet and liquids are directed into a drain. The space in the housing above the impingement plate is a separating chamber and is dimensioned so that a considerable drop in temperature results as the air expands effecting a useful degree of impingement plate cooling. In practice the air outlet is a straight length of tubing which may include a filter.

While such drop legs effectively collect contaminate matter, matter in vapor form presents a problem and another aspect of the invention is the provision of drop legs which also enable such vapors to be removed. To that end, the drop leg has an impingement plate which is a free fit within the housing and a bulkhead below the impingement plate which is sealed to the housing. The drain is an axial passage through a hub to which the impingement plates are connected to establish an intermediate chamber which is vented to the atmosphere. The bulkhead establishes with the bottom end of the housing a lower chamber into which the drain opens. The lower chamber has a separate drain. The first chamber is hereinafter called the intermediate chamber. The periphery of the impingement plate and the housing establish an orifice such that air can flow into the upper chamber but with an attendant pressure drop thus effecting the further cooling of the impingement plate, condensing water vapor and coalescing oils. Where required, the dimensions of the orifices of such drop legs may be varied.

Another aspect of the invention, also concerned with the removal of vapors, utilizes a construction which may be quite similar to that broadly summarized above. In this embodiment, the bulkhead is replaced by a baffle plate which is a free fit within the housing and intermediate chamber is without vents to the atmosphere and opens into the lower chamber through the orifice between the baffle plate and the housing. The drain from the lower chamber is provided with an automatic drain control resulting in a pressure build up in the lower chamber. This pressure so balances the pressure on vapors entering the intermediate chamber from the impingement chamber that fluids in the intermediate chamber become sufficiently quiet so that vapors coalesce with the coalesced contaminants passing into the lower chamber and carried therefrom by the water through the automatic drain on a nearly continuous basis.

Another objective of the invention is to provide a housing well suited for drop legs of the above types. In accordance with this aspect of the invention, the housing consists of a length of tubing and upper or top and lower or base plates dimensioned to fit in the ends of the tube to the extent permitted by shoulders with which the end plates are formed. A tie rod extends axially through the tubing and one end is threaded into and sealed to the top plate and its other end extends freely through and is sealed to the base plate against leakage. A nut threaded on the exposed end of the bolt holds the assembly together.

Where only an impingement plate is needed, the plate has an axial bore to receive the tie bolt and where a bulkhead or a baffle plate is also required an axial bore for the tie bolt extends through both the impingement plate and the bulkhead or baffle plate.

Another objective of the invention is to combine the impingement plate and the bulkhead or the baffle plate into a module including a support to seat on the base plate with the drain an axial passageway through the module freely receiving the tie bolt.

Another important objective of the invention is to provide for the adjustment of orifice dimensions with those having one sixteenth of an inch of proven satisfaction in use. An objective attained by providing the tube with a step overlying the periphery of the impingement plate and defining therewith the orifice and by providing means to effect the movement of the impingement plate towards or away from the step to effect wanted changes in the dimensions of the orifice. A particular objective is to utilize the tubular housing and a module, both described above, with a compression spring between the impingement plate and the top plate of the housing to hold the module seated against the bottom plate. The bottom plate is slidably sealed to the housing as is the bulkhead where used. Accurate adjustments of the orifice are effected by utilizing the turning of the tie bolt nut in one direction to permit the slight movement of the base plate away from the top plate required to enable the spring to effect the slight repositioning of the impingement plate and in the other direction to advance the base plate towards the top plate against the resistance of the spring to effect the wanted repositioning of the impingement plate.

Other objectives of the invention and the manner in which they are attained will be apparent from the description of presently preferred embodiments and the claims.

BRIEF DESCRIPTION OF THE DRAWINGS

The accompanying drawings illustrate presently preferred embodiments of the invention of which

FIG. 2 is a side elevation of a drop leg filter in accordance with another such embodiment;

FIG. 3 is a section taken substantially along the indicated line 3—3 of FIG. 2;

FIG. 4 is a view similar to FIG. 1 of another embodiment of the invention with the drain provided with an automatic control;

FIG. 5 is a somewhat schematic view of a typical installation;

FIG. 6 is a vertical section of the drain control; and

FIG. 7 is a bottom view thereof.

DESCRIPTION OF THE PREFERRED EMBODIMENTS

Figure 1:
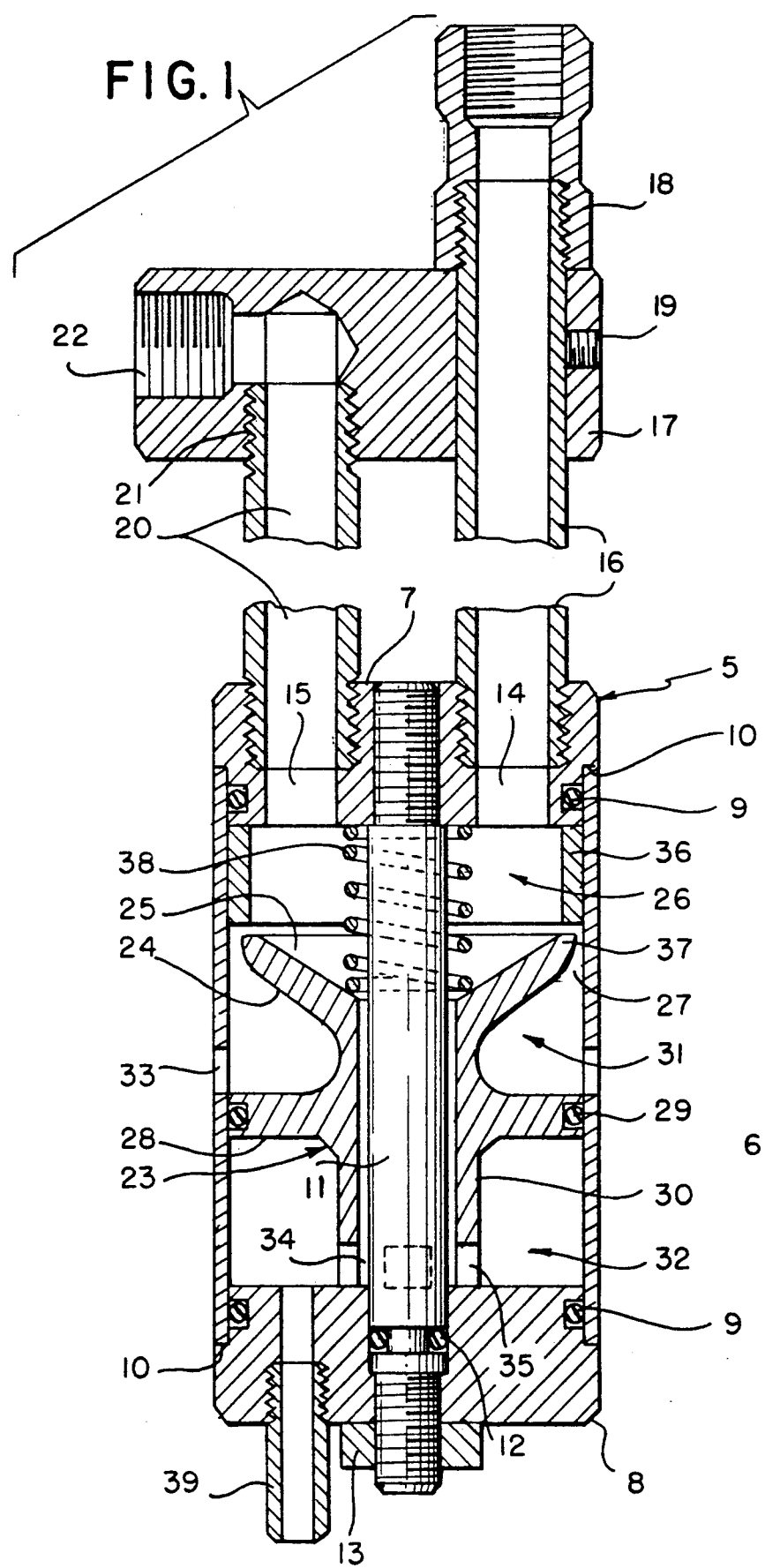
FIG. 1 is a vertical section, on an increase in scale, of a drop leg filter in accordance with one such embodiment of the invention with the inlet and outlet tubes broken away to foreshorten the figure.

The embodiment of the invention illustrated by FIG. 1 has a housing, generally indicated at 5, shown as consisting of a tube 6, an upper or top end plate 7 and a bottom end or base plate 8. The end plates are dimensioned to fit within the ends of the tube 6 and are provided with seals 9 and formed with shoulders 10 against which the ends of the tube 6 may be seated. The housing 5 is completed by a tie bolt 11 which extends axially through the tube 6 with one end threaded in and sealed to the upper end plate 7 and the other end extending freely through the bottom end plate 8 and provided with a seal 12. A nut 13, such as an elastic or self locking nut, is threaded on the exposed end of the bolt 11 into contact with the bottom end plate 8 until the shoulders 10 butt against the ends of the tube 6. It is important to note that the housing will remain assembled if the nut 13 is backed off to a limited extend as the seals 9 will then frictionally hold the tube 6.

The top plate 7 has ports 14 and 15 which are located on opposite sides of the center line of the housing 5. A straight rigid tube 16 is sealed in the port 14 with its upper end extending through a yoke 17 and provided with a fitting 18 for use in connecting to it the upstream section, not shown, of a compressed air line. The length of the tube 16 is such that the molecules of any entrained matter in the air stream discharged into the housing 5 will be travelling in straight lines. A set screw 19 serves to lock the yoke 17 to the tube 16.

A like but somewhat shorter tube 20 is secured in the port 15 with its upper end sealed in a bore 21 in the yoke 17. The yoke 17 has a laterally opening port 22 which intersects the bore 21 and is dimensioned to enable the downstream section, not shown, of the compressed air line to be coupled thereto.

A module, generally indicated at 23, is confined within the housing 5 and includes an impingement plate 24 having a downwardly and inwardly inclined surface 25 directly exposed to the ports 14 and 15 and spaced from the top plate 7 to establish a separating or expansion chamber, generally indicated at 26. The impingement plate 24 is a free fit within the housing to provide an orifice 27. The module 23 also includes a bulkhead 28 provided with a seal 29 and is a sliding fit in the tube 6. The module has an axial hub 30 which extends below the bulkhead 28 and rests on the bottom plate 8. The bulkhead 28 thus establishes with the impingement plate 24 an intermediate chamber, generally indicated at 31 below the separating chamber 26, and with the bottom plate 8 a lower chamber, generally indicated at 32. The tube 6 has vents 33 opening from the upper chamber 31 to atmosphere. The hub 30 has an axial bore 34 which freely receives the bolt 11 and establishes a drain leading from the center of the surface 25 and opening through ports 35 into the lower chamber 32 which serves as a settling chamber for separated contaminants.

The tube 6 is provided with an internal step 36 in the separating chamber 26 which overlies the upper periphery of the impingement plate 24 to define therewith an annular orifice 37 dimensioned to permit a limited air flow from the separating chamber 26 into the subjacent chamber 32 such that it is attended by a pressure drop and the resultant further cooling of the impingement plate 24 and also the bulkhead 28.

The downwardly and inwardly inclined surfaces 25 are directly exposed to the inlet air stream with the inclination of the cooled surfaces such that the air stream rebounding from them is directed generally towards the outlet port 15 with separated particles and condensates entering the bore 34, the effective dimensions of which are the annular space surrounding the tie bolt 11, and discharged into the settling chamber 32 which is either continuously or periodically drained through a port 38 provided in the bottom plate 8.

As the disclosed embodiments provide for the adjustment of the orifice 37 as required by operating conditions, the dimensions of the orifice 27 may be relatively large. Adjustments of the orifice 37 are effected by small axial adjustments of the position of the module 23 and accordingly of the impingement plate 24 relative to the step 36 to decrease or widen the orifice 27. For that purpose, a compression spring 39 in the chamber 26 surrounds the bolt 11 and is seated on the surfaces 25 of the impingement plate 24 close to the drain and is backed by the top plate 7 between the ports 14 and 15.

By turning the tie bolt nut 13 in the loosening direction, the spring 39 is operable to force the module 23 and the end plate 8 away from the top plate 7 and by turning the nut 13 in a tightening direction, the base plate 8 and the module 24 are moved against the resistance of the spring 39 towards the top plate 7 thus enabling fine adjustments of the orifice to be accurately made.

As the embodiment of the invention illustrated by FIGS. 2 and 3 is generally similar to that illustrated by FIG. 1, only different or added features will be detailed but corresponding parts are identified by the same reference numerals distinguished, however, by the suffix addition "A".

In FIGS. 2 and 3, the outlet tube 20A is of reduced length and is connected to the base plate 40 of a filter, generally indicated at 41.

The yoke 17A has a vertical bore dimensioned to receive a holder 42 having an end extending below the yoke 17A and provided with a socket 43 intersected by the laterally opening outlet port 44 on opposite sides of which there are seals 45 carried by the holder 42.

The filter 41 consists of a tube 46 with the base 40 and an annular head 47 fitted within and sealed thereto. The heat 47 fits on the exposed end of the holder 42 and into an annular seat 48 surrounding the lower end of the bore 41.

A filter element 49 surrounds and is spaced from a supporting tube 50 having lengthwise slots 51 with one tube end within the socket 43 and its other end supported by a headed connector 52 seated in and closing an axial bore 53 in the base plate 40. It will be noted that the outlet tube 20A opens into the filter 41 at one side of the filter element.

The embodiment of the invention illustrated by FIG. 4 is shown as generally similar to the drop leg of FIG. 1 and will not again be detailed. Corresponding parts are designated by the same reference numerals distinguished by the suffix addition "B."

The drop leg illustrated by FIG. 4 has its separating chamber 26B dimensioned to ensure the wanted degree of cooling of the impingement plate 25B as the housing does not have ports venting the intermediate chamber 31B to the atmosphere. The module 23B has a baffle plate 54 in place of the bulkhead 23. The baffle plate 54 is a free fit in the housing 5B to establish an orifice 55. In addition, the drain 39B from the lower chamber 32B is provided with a conventional automatic drain control which is generally indicated at 56 such as model 20-401 manufactured by Monnier, Inc. of Michigan.

During operation of the drop leg, turbulent vapors under the pressure prevailing in the separating chamber 26B enter the intermediate chamber 31B through the orifice 37. Contents of the chamber 31 can pass into the lower chamber 32B through the orifice 55 but are retarded by the pressure in the lower chamber. As a consequence, vapors within the cooled intermediate chamber 31B so lose their turbulence and become sufficiently quiet so that coalescence occurs with the coalesced contaminants entering the lower chamber 32B and carried by the water therein through the drain 39B with the drain control so operating that the flow from the chamber 32B is nearly continuous.

While the automatic drain control 56 is commercially available, its construction and operation are briefly summarized. Air and water under pressure enter through the port 57 and into the lower diaphragm chamber 58 via ports 59. The diaphragm 60 rises seating the valve 61 from its normally open position.

When water so accumulates within the drain control 56 as to enter the ports 62, the float 63 is lifted from its seat 64 allowing air to enter the upper diaphragm chamber 65 to balance the pressure on both sides of the diaphragm 60 then permitting the spring 66 to operate to unseat the valve 61 allowing the water and coalesced contaminants to escape through the drain 67.

When the water is drained below the ports 62, the float 63 is again positioned on its seat 64 and the pressure in the upper chamber 65 is vented through the port 68 with the diaphragm operable to close the valve 61. The small differential between the upper and lower surfaces of the float 63 enables the pressure to hold the float on its seat until a positive float action occurs.

By way of summary, reference is made to FIG. 5 in which a header 69 from a compressor, not shown, has an air leg 70 connected to the drop leg housing 5B which has a connection with an air line 71 leading to the location where the processed air is to be used. The drop leg housing 5B is shown as having an automatic drain control 56.

From the foregoing, it will be apparent that drop legs in accordance with the invention, with or without filters are not only extremely efficient in use due to their effectiveness in removing water from the entering air but also are well adapted to meet manufacturing requirements.

I claim:

1. A drop leg to be incorporated in a compressed air line, said water leg including a housing having top and bottom ends, the top end having an inlet and an outlet, the bottom end having a drain, an impingement plate within the housing and spaced from the top end to establish a separating chamber and directly exposed to the inlet and outlet, the upper surface of the impingement plate downwardly and inwardly inclined towards the center thereof, the inlet and outlet ports located on opposite sides of said center and the inclination of said surface such that the air stream through the inlet after striking said surface rebounds generally towards the outlet, and the impingement plate has a water drain adjacent the center thereof and in communication with the drain in the bottom end.

2. The drop leg of claim 1 in which the inlet is a straight length of tubing the minimum length of which is approximately fifteen times the tube internal diameter to insure that the air molecules and entrained matter travel along straight paths.

3. The drop leg of claim 1 in which the outlet includes a filter and a yoke connects the outlet and the inlet.

4. The drop leg of claim 1 in which the impingement plate is spaced above the bottom end of the housing to establish an outlet chamber into which the drain opens.

5. The drop leg of claim 1 in which the impingement plate is a free fit within the housing, means connected to an end of the housing support the impingement plate, a bulkhead between the impingement plate and the bottom end is sealed to the housing and establishes with the impingement plate an upper chamber and with the bottom end a lower chamber, the housing has vents opening the upper chamber to the atmosphere, the periphery of the impingement plate and the housing establish an orifice dimensioned to permit limited air flow from the separating chamber into the upper chamber with an attendant pressure drop to effect the cooling of the impingement plate, and the drain of the impingement plate is a conduit opening into the lower chamber.

6. The drop leg of claim 5 in which the housing has a marginal portion overlying the periphery of the impingement plate to establish the orifice.

7. The drop leg of claim 6 in which the adjustable means are connected to the impingement plate to enable the relationship between the impingement plate and the marginal portion to vary the dimensions of the orifice.

8. The drop leg of claim 5 in which the housing includes a tubular member provided with a marginal portion overlying the periphery of the impingement plate to establish the orifice, the bottom end and the bulkhead are slidably sealed to the tubular member, adjusting means connecting the top and bottom ends to the tubular member, the adjusting means connecting the bottom end to the tubular member so that the bottom end may be moved towards and away from the top end while slidably attached to the tubular member, the impingement plate includes a depending central support resting on the bottom end, resilient means between the upper end and the impingement plate yieldably maintains the support seated on the bottom end, operation of the adjusting means to effect movement of the bottom end attended by corresponding movement of the impingement plate and a change in the dimensions of the orifice.

9. The drop leg of claim 8 in which the drain conduit extends through the support.

10. The drop leg of claim 9 in which the means connecting the top and bottom ends to the tubular member includes a tie bolt extending freely through the bottom end, the support of the impingement plate and has one end threaded into the top end with the other bolt end exposed on the outside of the bottom end to be engaged and turned in one direction or the other, in one direction enabling the resilient means to move the periphery of the impingement plate away from the overlying marginal portion of the housing and in the other direction overcoming the resistance of the resilient means and moving said periphery towards said marginal portion.

11. The drop leg of claim 10 in which the impingement plate, bulkhead, and support are components of a module and the bulkhead is slidably sealed to the tubular member.

12. The drop leg of claim 1 in which the water drain is in the form of a depending hub, the impingement plate is a free fit within the housing and provides an exit orifice from the separating chamber for vapors containing contaminants, a baffle plate below the impingement plate and connected to the hub defines with the bottom end of the housing an outlet chamber and with the impingement plate an intermediate chamber, the baffle plate is a free fit within the housing to provide an outlet orifice from the intermediate chamber, and the drain from the outlet chamber is provided with an automatic drain control responsive to a predetermined water build up in the outlet chamber whereby the water build up is attended by a pressure build up effective to so retard flow from the outlet orifice that fluids in the intermediate chamber become sufficiently quiet to permit vapors to coalesce and then pass into and through the outlet chamber.

13. The drop leg of claim 12 in which the impingement, baffle plate and hub are components of a module.

* * * * *